United States Patent [19]
Portalier

[11] 3,933,098
[45] Jan. 20, 1976

[54] SOLID CYLINDRICAL CENTRIPETALLY BURNING PROPELLANT WITH FOUR CONVEX ARCED LOBES

[75] Inventor: Pierre Louis Portalier, Sevres, France

[73] Assignee: Societe Nationale des Poudres et Explosifs, France

[22] Filed: Mar. 11, 1974

[21] Appl. No.: 449,927

Related U.S. Application Data

[63] Continuation-in-part of Ser. No. 396,389, Sept. 12, 1973, abandoned.

[30] Foreign Application Priority Data
Sept. 26, 1972 France .............................. 72.33941

[52] U.S. Cl. ................................. 102/99; 102/104
[51] Int. Cl.² ........................................... F42B 5/16
[58] Field of Search ................................ 102/99, 104

[56] References Cited
UNITED STATES PATENTS

| | | | |
|---|---|---|---|
| 2,728,295 | 12/1955 | Rubin et al. ....................... | 102/99 X |
| 3,029,736 | 4/1972 | De Shazo .......................... | 102/99 X |
| 3,256,819 | 6/1966 | Leeper ............................... | 102/99 X |
| 3,691,955 | 9/1972 | Jordan et al. ..................... | 102/99 |

FOREIGN PATENTS OR APPLICATIONS

17,994  9/1894  United Kingdom................... 102/99

OTHER PUBLICATIONS

ABS Journal, *Recent Advances in Solid Propellant Grain Design*, Vandenkerchoue, J. A., July, 1959, pp. 483–490.

*Primary Examiner*—Verlin R. Pendegrass
*Assistant Examiner*—Peter A. Nelson
*Attorney, Agent, or Firm*—Bucknam and Archer

[57] ABSTRACT

A solid cylindrical centripetally burning propellant element comprises four lobes, the cross-section of each lobe comprising a convex arc tangential to a right circular cylinder circumscribing the element, of radius R, the radius of the arc being equal to the combustion thickness e of the element. The element has only two combustion residues by which it may be secured in the combustion chamber of a rocket engine.

16 Claims, 12 Drawing Figures

3,933,098

SOLID CYLINDRICAL CENTRIPETALLY BURNING PROPELLANT WITH FOUR CONVEX ARCED LOBES

This application is a continuation-in-part of U.S. Ser. No. 396,389, filed Sept. 12, 1973, now abandoned.

The present invention relates to a solid propellant element which is designed to burn from the outside or centripetally and which exhibits very high performance. The invention also relates to the manner of manufacture and the fixation in a propulsion device. The invention also relates to the application of the solid propellant bloc to a rocket engine or other propulsion device.

With propellants of this type, it is in general desirable to achieve the most satisfactory performance, namely to achieve:

1. a good effective filling coefficient of propellant devices (ratio of volume of the bloc less the volume of the residue over the volume of the cylinder which circumscribes it) for the purpose of increasing the ratio of the propellant, that is the $$\frac{\text{energy}}{\text{weight}};$$

2. a small residue at the end of the combustion (portion of the propellant bloc remaining at the time when the combustion ends or slows up considerably due to an abrupt decrease in surface) for the purpose of increasing the effective filling coefficient;
3. a decrease of the surface of combustion which is moderate (ratio of initial and instantaneous surfaces of combustion) for the purpose of limiting the variation in thrust developed by the the propulsion device and particularly the total decrease (ratio between the initial and final combustion surfaces).

Several known combustion blocs designed to burn from the outside are generally utilized for the achievement of propellants of low cost. It is specially important to achieve, on one hand, a simple mode of fabrication by avoiding internal channels in the bloc or by avoiding external lateral coatings and on the other hand to achieve a mode of fixation in the low cost propulsion device by limiting the number of residues at the end of the combustion because each residue must be fixed to the propulsion device.

In the case of cylindrical or prismatic blocs designed to burn externally with entirely convex surface, the surface of combustion which diminishes by one half at the most, decreases substantially and the thrust exerted by the combustion gas decreases substantially during the course of the trajectory of the propulsion devices. The total decrease may reach values between 7 and 10. In order to remedy this disadvantage, partial compensation may be achieved by means of a partial coating of the lateral external surface of the element with a combustion inhibitor. This inhibitor permits the creation during the combustion of areas of concave portions which at least partially compensate for the decrease of areas of convex surface. However, the design of a propellant bloc with such an inhibitor substantially increases the manufacturing cost. Moreover, the application of the inhibitor involves a delicate fabrication step.

In addition the inhibitor reduces the space for the propellant, a fact which decreases the filling coefficient.

Another approach which has been used to limit the decrease of the surface of combustion of the propellant bloc resides in arranging for the external combustion surface to include progressively concave surfaces in order to compensate for the decrease of the other surfaces of the bloc.

Propergol blocs designed to burn from the outside, which have a combustion surface decreasing to a sufficiently small extent, with the external surface being inscribed in a cylinder, are known. The transversal cross-section of these blocs presents n identical lobes, with the axis of the circumscribing cylinder in the order of $n$.

These known propergol blocs, however, present the following disadvantages:

1. the decrease in combustion area is particularly large when the combustion thickness of the element (the depth of material consumed) is quite high. For example, when the combustion thickness is equal to one-half the radius of the cylinder circumscribing the element, the decrease in combustion ares is of the order of 2.
2. the number of combustion residues left (the result of fragmentation of the element at a certain stage of combustion) is high because it is equal to $n + 1$, $n$ being the number of lobes of the bloc. This requires multiplying the zones of fixation between the bloc and the propulsion device.
3. the ratio of the volume of these residues to the total volume of the element is high and this causes a waste of propellant.
4. it is not possible to change continuously the relative combustion thickness $e/R$ ($e$ being the combustion thickness of the element before extinction of any part of the combustion surface leaves the combustion residues and R being the radius of the cylinder circumscribing the element) and the only possible change is in discontinuous fashion by changing the number of lobes.
5. the preparation of elements of low relative combustion thickness $e/R$ presents great difficulties. Indeed, this may be achieved by increasing the number of lobes, but this would also increase the size and number of residues.

The object of the present invention is to avoid the disadvantages mentioned hereinabove and to provide a propellant element capable of centripetal or external combustion having 1. limited decrease in the surface of combustion,
2. a reduced number of combustion residues and reduced size of the residues, factors which permit simple fixation and high effective filling coefficient,
3. a relative combustion thickness which varies at a continuous rate for a determined number of the lobes, the general configuration of the element remaining constant.

This permits the achievement of blocs having a wide range of relative combustion thickness.

In accordance with the present invention, the propellant element capable of centripetal combustion has the external sufface inscribed in a cylinder, the radius of which is R and the cross-section of the combustion surface of the element comprises four similar lobes. The element presents two perpendicular axes of symmetry and the external contour of each lobe comprises an arc of a circle of radius $e$ whose center is at a distance (R-e) from the axis of the cylinder, where e is equal to the combustion thickness of the element and R is the radius of a cylinder circumscribing the element, said arc being tangential to said cylinder of radius R. Two points of the external contour of closest approach of the cross-section to the axis are situated at a distance e from the center of the cylinder of radius R.

The propellant element with the characteristics discussed hereinabove presents a combustion surface with limited decrease and even more significant, offers the advantage that the number of combustion residues is limited to 2, which is equal to the order of symmetry of the axes of the elements. In addition, the size of the residues is very small.

The shape of the elements in accordance with the invention permits to achieve very high filling coefficients and a thickness of relative combustion $e/R$ which varies in a continuous fashion over a wide range, without changing the number of lobes. The manufacture of the propellant elements according to the invention does not present special difficulties.

In accordance with the invention, the thickness of combustion $e$ of the block is substantially such that: $0.15R < e < 2\ R13$ and preferably $0.2R < e < 0.4R$. The shape of the blocks is, in fact, equally compatible with thicknesses of combustion as low as $0.15R$ and with thicknesses as high as $2\ R/3$. When the thickness is greater than $0.5R$, the surface decrease becomes greater than 2 but this disadvantage is compensated to the extent that the blocs according to the invention exhibit a percentage of residues substantially inferior to the percentage of residues substantially inferior to the percentage of residues of the blocs known in the art prior to the invention. The invention also contemplates the application of the blocs to the manufacture of propulsion devices.

In use, the propellant element is preferably fixed against the front base of the combustion chamber in a propulsion device by means of two anchoring rods, each of which penetrates into the location of a residue of combustion of the element. In this manner, the bloc is so firmly fixed in the combustion chamber that the useful volume of propellant is not limited by the means of attachment nor by the inhibitor coatings.

Embodiments of the invention will now be described by way of example with reference to the accompanying drawings, in which.

Figure 1:
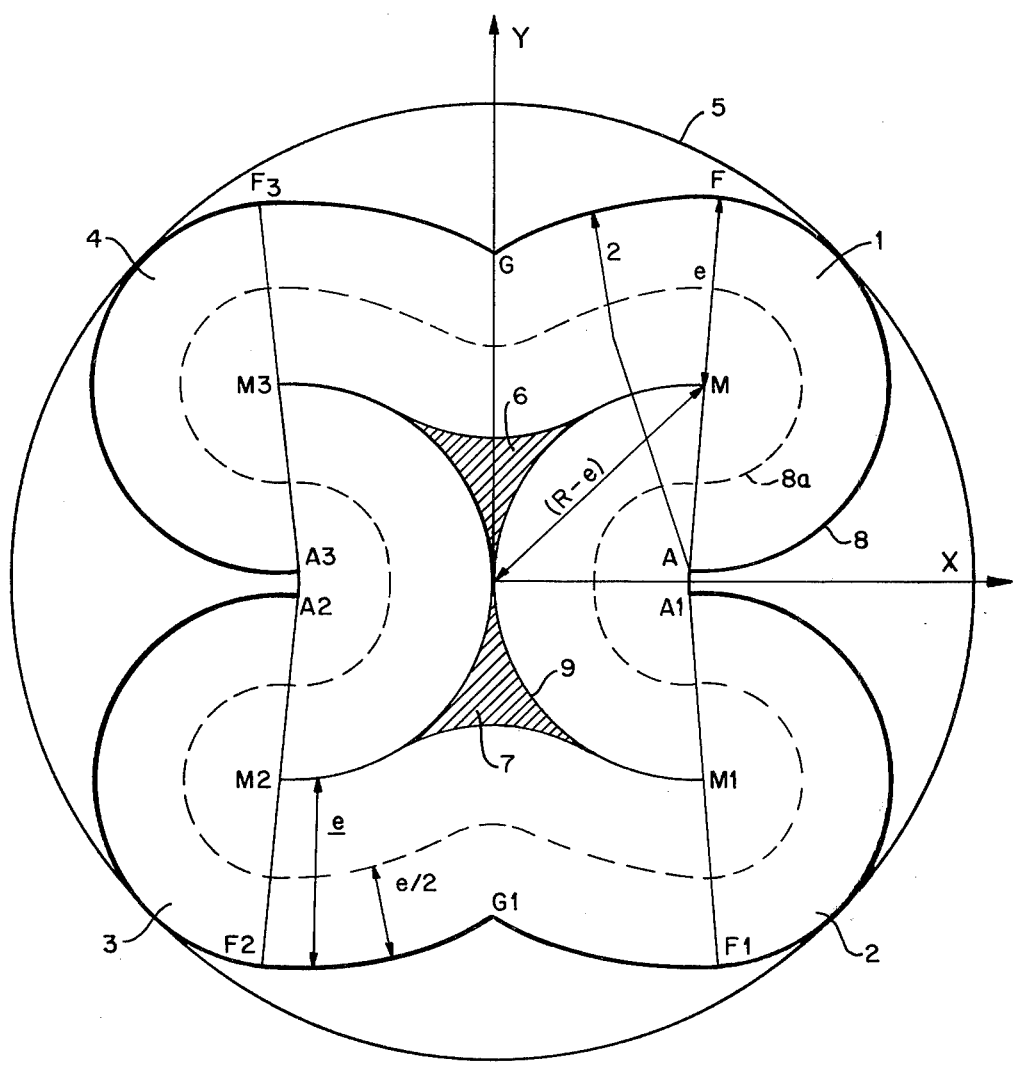
FIG. 1 is a diagrammatic view in transverse cross-section of a solid propellant element in accordance with the invention.

Referring first to FIG. 1, in transverse cross-section, the combustion surface of the solid propellant element shown has a contour comprising four similar lobes 1, 2, 3 and 4, which are mirror-symmetrical relative to two orthogonal planes passing through the axis 0 of a circumscribing cylinder 5 of radius R. The exteranl contour of each lobe 1, 2, 3 or 4 comprises an arc of a circle $AF, A_1F_1 \ldots$ or $A_3F_3$ tangential to the circle 5 and of radius $e$ equal to the combustion thickness of the block, the centres $M, M_1 \ldots M_3$ of which are situated at a distance (R-e) from 0.

The arcs $AF, A_1F_1 \ldots$ or $A_3F_3$ are connected by two broken identical arcs $FGF_3$ and $F_1G_1F_2$ consisting of arcs of a circle of radius $2e$ tangential to the above mentioned arcs, and at the other end by segments of a straight line $AA_1$ and $A_2A_3$, which intersect the plane OX at the points of closest approach of the contour to the axis O.

The external surface area of this propellant element consequently consists of concave and convex surface areas which increase and decrease respectively during combustion and which permit to limit the decrease of the combustion surface.

The position of the combustion residues 6 and 7, the external contour 9 of which is situated at a distance $e$ from the external contour of each lobe, has also been denoted in this Figure by cross-hatched areas. The residues are two in number and are arranged symmetrically relative to the axis 0.

The solid propellant element which has just been described functions as follows:

After igniting the external surface 8 of the element, the combustion surface travels towards the interior of the block. This combustion surface always remains parallel to itself, until the thickness of combustion $e$ is consumed. For example, FIG. 1 shows in broken lines the combustion surface $8a$ produced when the thickness $e/2$ has been consumed. Due to the contour of the external surface of the bloc, the combustion surface presents a limited decrease which is a function of the thickness consumed and the total decrease is limited to 1.55.

When the entire thickness $e$ has been consumed, the resulting combustion surface is the external surface 9 of the residues 6 and 7. Beyond this limit, the combustion area decreases very rapidly or disintegrates if the thermodynamic conditions and the composition of the propellant allow the combustion to continue.

Various particular cases of this general contour will now be described in more detail.

For simplicity, only the transverse cross-section of one of the four lobes of each element will be described, the three other lobes being identical. In FIGS. 2 to 9 each lobe AG is shown delimited by the two perpendicular planes OX and OY, O being the intersection of the axis of the cylinder of radius R with the plane of the Figure.

In all these examples, the external contour of the lobe AG comprises an arc AG or AF of a circle having a radius $e$, the arc being tangential to the circumscribing circle of radius R. One of the ends of this arc is extended in certain cases by another circular arc. The other end may optionally be extended by a straight portion or by an arc and a straight portion depending on the relative thickness of combustion ($e/R$) desired.

Figure 2:
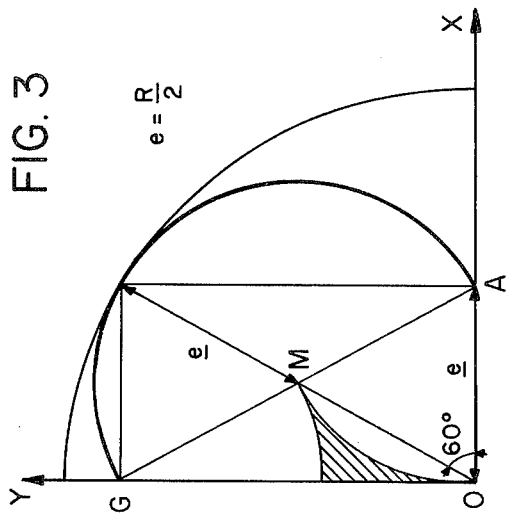
FIGS. 2 to 9 are diagrammatic views in partial transverse cross-section of other solid propellant elements in accordance with the invention.

EXAMPLE I (see FIG. 2)

In this embodiment, the external contour of the lobe AG consists of a convex arc tangential to the circle of radius R and center 0. This arc has a radius $e$ equal to the thickness of combustion of the block and, as the center, a point M situated at a distance (R−e) from 0. The end A of the arc is situated at a distance $e$ from 0.

This embodiment, which is particularly simple, is suitable for relatively high thicknesses of combustion $e$, such that:

$R/2 \leq e < 2\ R/3$

When $e$ is greater than $2R/3$ it is found that the surface area of combustion decreases too much for most purposes and the block does not perform satisfactorily.

When $e$ is equal to $R/2$, it leads to the following embodiment.

Figure 3:
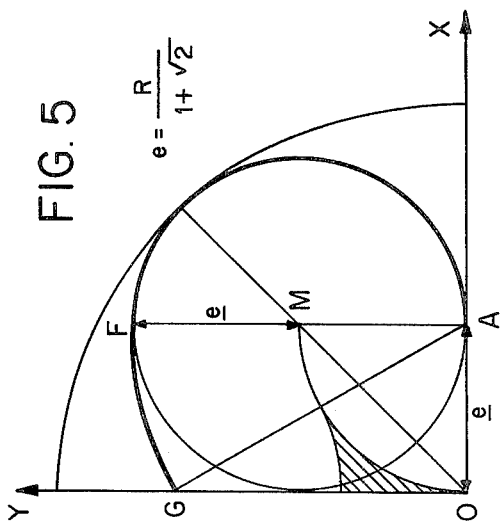

EXAMPLE II (see FIG. 3)

This example corresponds to the limiting case:
$$e = R/2$$
In this case, the arc AG is a semi-circle of center M situated at a distance $e$ from 0 and the angle between OM and OA is equal to 60°.

Figure 4:
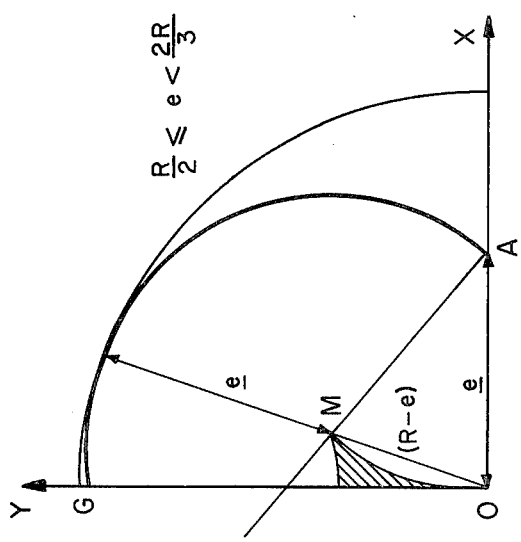

EXAMPLE III (see FIG. 4)

In this embodiment, the external contour of the lobe AG comprises a semi-circle AF tangential to the circle of radius R and center 0. The semi-circle AF has a radius $e$ equal to the combustion thickness of the element and a center M situated at a distance $(R-e)$ from 0. The end A of the semicircle AF is situated at a distance $e$ from 0 in the plane OX. The other end F of the semi-circle AF is extended to the plane OY by an arc of a circle FG having a radius of $2e$ and, as its center, the end A of the semi-circle AF.

This embodiment is suitable for average combustion thicknesses $e$, such that:
$$R/(1+\sqrt{2}) \leq c < R/2$$
The elements which fulfill the above characteristics generally exhibit ratios of initial to final combustion areas even closer to unity, that is with the combustion surface decreasing even less than in the preceding embodiments (Examples I and II).

The case wherein $e = R/2$ is that wherein F and G are identical (see Example II). When $e = R/(1+\sqrt{2})$, it leads to the following example.

Figure 5:
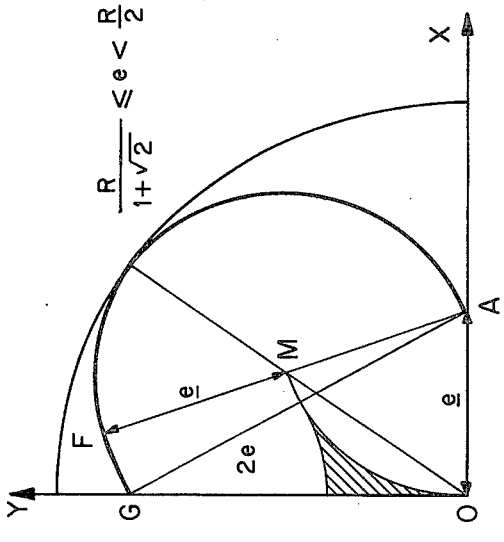

EXAMPLE IV (see FIG. 5)

This example corresponds to the limiting case:
$$e = R/(1+\sqrt{2})$$
of the preceding embodiment.

In this case, the circle of center M is tangential to OY and to OX at A'.

Figure 6:
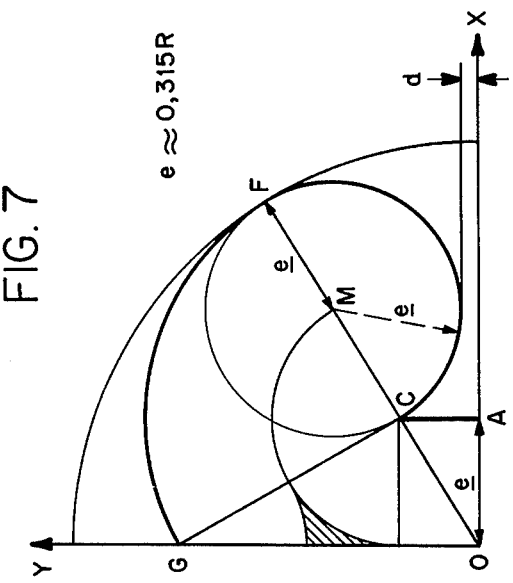

EXAMPLE V (see FIG. 6)

In this embodiment, the external contour of the lobe AG comprises a semi-circle CF tangential to the circumscribing circle of radius R and center O, the semicircle having a radius $e$, the center M of which is situated at a distance $(R-e)$ from 0. The semi-circle CF is tangential to a straight line parallel to OX situated at a distance $d$ from OX. The end C of the semi-circle CF is extended to the plane OX by a straight portion CA parallel to OY, situated at a distance $e$ from OY. The other end F of the semi-circle CF is extended by an arc of a circle FG having a radius $2e$ and, as its center, the end C of the semi-circle CF.

This embodiment is suitable for combustion thicknesses $e$ which are substantially such that:
$$0.315\, R \leq e < R/(1+\sqrt{2}).$$

The distance $d$ is chosen according to the method of manufacturing the element but is preferably greater than $0.03\, R$ to prevent the combustion from being too erosive in the zone beteeen two adjacent lobes of the element, and preferably less than $0.06\, R$ so as not to decrease too much the filling coefficient of the element.

This element provides the preferred combustion characteristics for most purposes; in particular, the combustion surface decreases little, the ratio of initial to final combustion areas is quite close to unity, the filling coefficient is high and the proportion of the residues is low.

Figure 7:
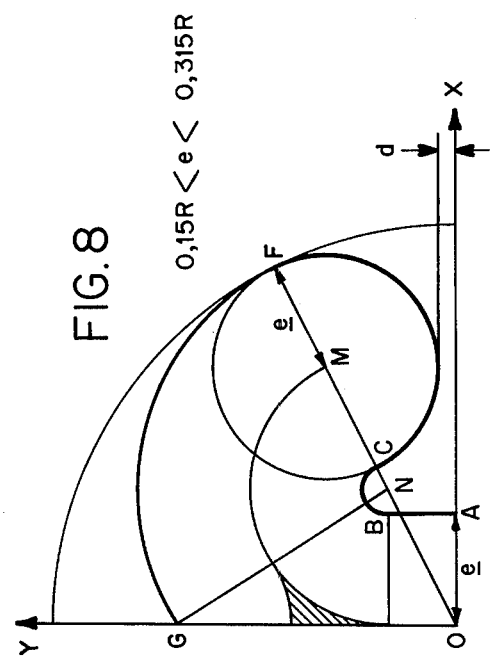

EXAMPLE VI (see FIG. 7)

This example corresponds to the limiting case in which C and F are on the axis OM. Here $e/R$ is very close to the value 0.315 which changes very little as a function of the distance $d$. In the extreme cases, when $d$ is 0, $e/R$ is defined by the equation:
$$(Z^2 - 1)(Z+1)^2 = Z^2$$
in which $$Z = \frac{R}{e} - 2$$

Essentially here $e/R$ is 0.315

Figure 8:
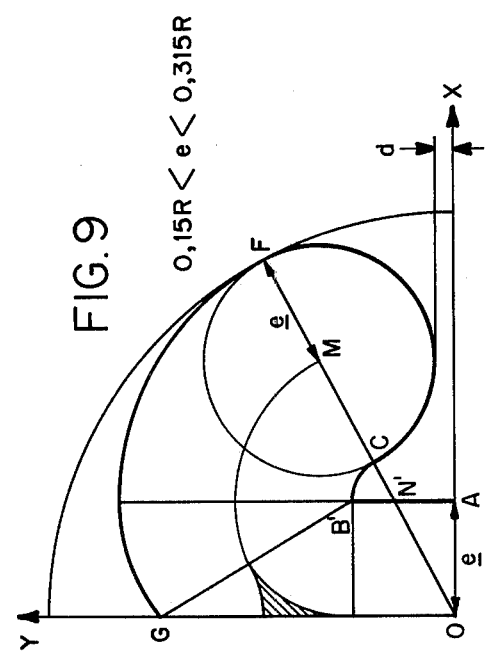

EXAMPLE VII (see FIG. 8)

In this embodiment, the external contour of the lobe AG comprises a semi-circle CF tangential to the circle of radius R and center O, having a radius $e$ and the center M of which is situated at a distance $(R-e)$ from O. C and F are the ends of the diameter aligned on OM. The semi-circle CF is tangential to a straight line parallel to OX, situated at a distance $d$ from OX. The end C of the semi-circle CF is extended by an arc CB of a circle having, as its center, the point N situated on the straight line OM.

The arc CB is extended by a straight portion BA parallel to OY and situated at a distance $e$ from OY, it being possible for this straight portion BA to be tangential to the arc CB (FIG. 8). The other end F of the semi-circle CF is extended by an arc FG of a circle centered on the point N.

This embodiment is suitable for low combustion thicknesses $e$, substantially such that:
$$0.15R < e < 0.315R$$
and preferentially such that:
$$0.20\, R < e < 0.315\, R$$
The element also has a combustion surface which decreases very little and a ratio of initial to final combustion areas which is close to unity and a small proportion of residues, but its filling factor is less than in the preceding embodiments.

Figure 9:
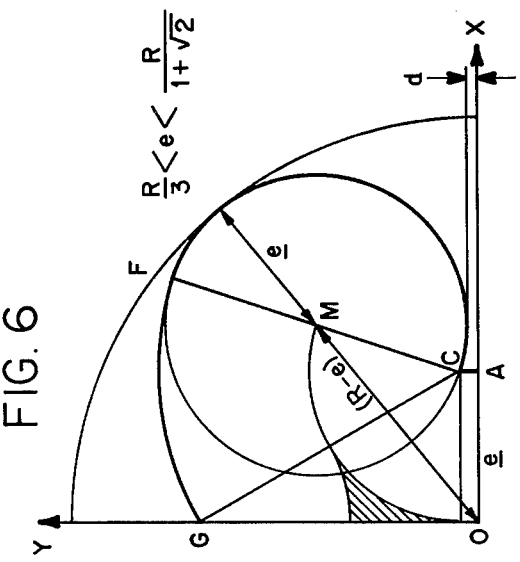

EXAMPLE VIII (see FIG. 9)

This embodiment differs from the preceding example in that the center N' of the arcs CB' and FG is situated on the straight portion B'A. The arc FG with center N' ends at G, situated at a distance $e$ from OY, and is connected to another arc of a circle of radius $2e$ centered at B'.

This embodiment is also suitable for low combustion thicknesses $e$, which are substantially such that:
$$0.15\, R < e < 0.315\, R,$$
and preferably such that
$$0.2\, R < e < 0.315\, R.$$

The table below gives some combustion characteristics of some of the examples of solid propellant elements given above.

In this table, $k$ denotes the ratio of the initial combustion perimeter $P_o$ (perimeter of the cross-section of the element) to the perimeter of the circumscribing cylinder of radius R.

$P_f$ denotes the final combustion perimeter of the element, when the thickness $e$ has been consumed.

$P_m$ denotes the combustion perimeter of the block when the thickness $e/2$ has been consumed.

It can be shown that:

$P_o/P_f$ is equal to $k/(k - e/R)$ and $P_o/P_m$ is equal to $k/(k - e/2R)$

P denotes the effective filling factor of the element: It is equal to 100 times the ratio of the volume of the element less the volume of the residues to the volume of the circumscribing cylinder.

P is also equal to $100(2k\,e/R - e^2/R^2)$ $q\%$ is the proportion of residues and is equal to 100 times the ratio of the volume of the residues to the volume of the circumscribing cylinder.

| number of example | limit value | III | V | V | VII | VII | VIII | VIII | VII |
|---|---|---|---|---|---|---|---|---|---|
| e/R |  | 0.45 | 0.40 | 0.35 | 0.31 | 0.275 | 0.25 | 0.20 | 0.15 |
| k | 1 | 1.045 | 1.12 | 1.233 | 1.43 | 1.45 | 1.5 | 1.94 | 1.665 |
| Po/Pf | 2 | 1.75 | 1.55 | 1.395 | 1.272 | 1.235 | 1.2 | 1.13 | 1.10 |
| Po/Pm | 1.33 | 1.265 | 1.218 | 1.165 | 1.121 | 1.105 | 1.09 | 1.06 | 1.065 |
| p(residue excluded) | 75 | 73.8 | 73.7 | 75.9 | 78.7 | 72.1 | 68.7 | 65.5 | 47 |
| % of residue | 3.5 | 2.8 | 2.5 | 2 | 1.1 | 1.5 | 1.4 | 0.7 | 1.7 |
| Number of residues | 2 | 2 | 2 | 2 | 2 | 2 | 2 | 2 | 2 |

It will be seen that the ratios $P_o/P_f$ and $P_o/P_m$ have a limit value of 2 and 1.33 respectively, a fact which shows that the combustion surface of the blocks of relative thickness lower than 0.5, in accordance with the invention, presents a limited decrease. These ratios are particularly important when the elements have a thickness of average or low value and particularly when the thickness is between 0.20 and 0.40R because they exhibit simultaneously very satisfactory percentage of residue and filling coefficient.

The values of p demonstrate that in every case the effective filling coefficient is high. The best coefficient p is achieved when the value e is average or close to 0.31R. In addition, the proportion of the residue remains very low.

The values indicated for p show that, in every case, the effective filling factor is high; the best coefficient p, however, being obtained for average values of e in the range of 0.31R. Moreover, the proportions Q of residues remain very low.

These combustion characteristics are better than would be the case for an element comprising n identical symmetrical lobes which exhibit a ratio to the axis in the order of n.

Moreover, as the examples which have been described show, the elements also possess the advantage of having characteristics which can be varied continuously during design, without changing the number of lobes.

In particular, it is possible to change the ratio $e/R$ between widely different values such as, for example, 0.10 and ⅓ whilst keeping the number of lobes equal to 4.

The elements can be manufactured without difficulty by suitable processes of moulding or extrusion from known compositions of propellant materials, moulding being preferably used in the case of thick blocks and extrusion in the case of thin blocks.

Figure 10:
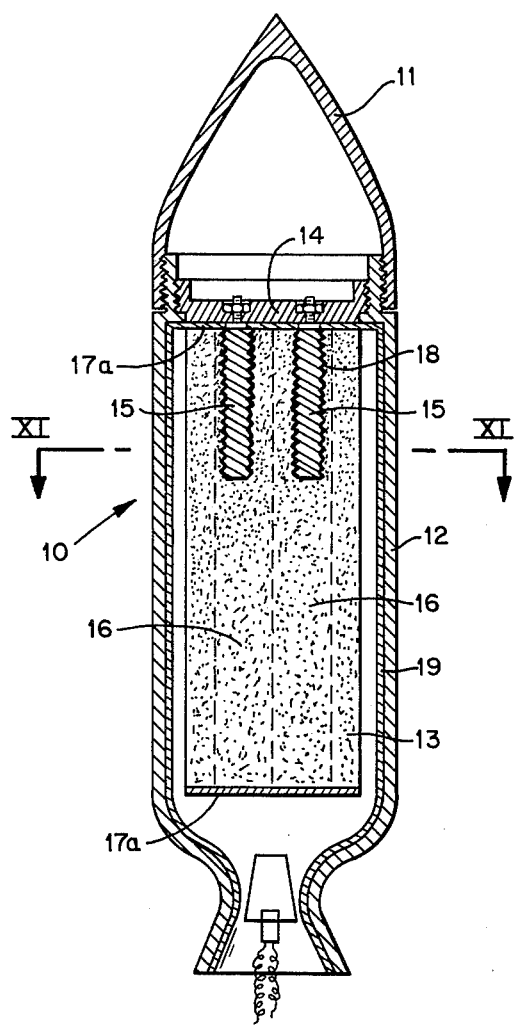
FIG. 10 is a view in longitudinal cross-section of a propulsion device in accordance with the invention.
Figure 12:
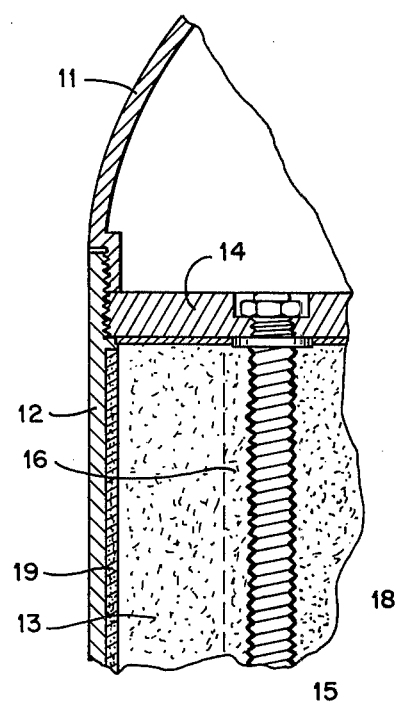
FIG. 12 is a view in partial longitudinal cross-section of a variant of the propulsion device.
Figure 11:
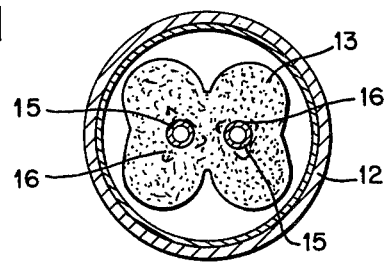
FIG. 11 is a view in transverse cross-section along the line XI—XI of FIG. 10.

FIGS. 10 to 12 of the drawings show a propulsion device 10 comprising a head 11 and a body 12, in the interior of which is located one of the elements 13 shown in FIGS. 1 to 9 of the drawings.

The body 12 of the propulsion device comprises a front base 14 which separates it from the head 11. According to one embodiment of the invention, the element 13 is fixed to the front base 14 of the body 12 of the propulsion device by means, preferably comprising two anchoring rods 15, which penetrate into the two combusion residues 16 of the element.

This arrangement makes it possible to fix firmly the solid propellant element 13 in the interior of the body 12 of the propulsion device, without in any way decreasing the useful volume of propellant in the element.

In order that combustion take place only perpendicularly to the axis of the element and in order that the decrease in combustion area during firing be low, the bases of the latter are coated with a combustion inhibitor 17a and 17b, especially in the case of relatively thick and short elements. However, it is possible to dispense with the inhibitor 17 in the case of longer elements.

Moreover, it is necessary for the rods 15 themselves to be intimately welded to the propellant by an inhibiting coating 18, it being possible for this inhibitor to be limited to the vicinity of the parts of the anchoring rods which penetrate into the block, so as to form a joint.

Certain applications require that the propellant element 13 be wedged in the interior of the body 12 of the propulsion device. This wedging can be achieved by direct contact or by means of a coating 19 of a refractory material which adheres to the body and is in contact with the block 13.

Various modifications to the embodiments which have just been described will occur to those skilled in the art. For example, the transverse cross-section of the blocks can be altered. The arcs FG and BC can especially be arcs other than arcs of a circle, but nevertheless approaching the latter rather closely, although they should still be tangential to the circular arc CF and equidistant from one another and $2e$ apart.

What is claimed is:

1. A solid elongated externally burning propellant element, the external configuration being such that the element retains its general configuration during combustion, the configuration of the element being such that the element may be inscribed in a cylinder of radius R, the cross section of the element having a contour comprising four identical connected lobes, said element having a first and a second perpendicular planes of symmetry, said element exhibiting mirror-symmetry with respect to said first and a second perpendicular planes passing through the axis of said cylinder of radius R, each lobe comprising a convex arc of a circle of radius e whose center is at a distance $(R - e)$ from the axis of the cylinder, where e is the combustion thickness of the element, said arc being tangential to said cylinder, and each arc contains only one point at the minimum distance $e$ from the axis of the cylinder, the four points of the arcs at said distance $e$ being symmetrical with respect to the axis of the cylinder, the thickness of relative combustion $e/R$ varying at a continuous rate during combustion, whereby the combustion of the element leaves only two combustion residues.

2. A propellant element as claimed in claim 1 wherein the combustion thickness $e$ is such that
$0.15R < e < 2R/3$ 3. A propellant element as claimed in claim 1, wherein the combustion thickness $e$ is such that
$0.2R < e < 0.4R$ 4. A propellant element according to claim 1 wherein each lobe consists of an arc of radius $e$ and
$$\frac{R}{2} \leq e < \frac{2R}{3}$$

5. A propellant element according to claim 4 wherein
$$e = \frac{R}{2}$$
and said arc is a semicircle of center M which is located at a distance $e$ from $0$, $0$ being the center of said cylinder of radius R.

6. A propellant element as claimed in claim 1, wherein the combustion thickness $e$ is such that $r/(1 + \sqrt{2}) \leq e < R/2$ and wherein said arc of radius $e$ of each lobe is semi-circular, the first end of said arc being in said first plane at distance $e$ from the center of said cylinder of radius R and the other end of said arc being extended by a further arc of a circle of radius $2e$, centered on said first end.

7. A propellant element according to claim 6, wherein
$e = R/(1 + \sqrt{2})$

8. A propellant element according to claim 1, wherein the combustion thickness $e$ is such that
$0.315R \leq e < R/(1 + \sqrt{2})$
each lobe AG comprises arc CF and arc FG, said arc CF has radius $e$, is semi-circular, is tangential to a straight line parallel to one of said symmetry planes with center situated at a distance $R - e$ from the center of the cylinder, said arc FG having radius $2e$ and having as its center the end C of said arc CF.

9. A propellant element according to claim 8 wherein $e$ is about $0.315 R$.

10. A propellant element as claimed in claim 1 wherein the combustion thickness $e$ is such that $0.15R < e < 0.315 R$ and wherein each of said lobes consists of a first arc of radius $e$ which is semi-circular, is tangential to a straight line parallel to one of said symmetry planes, is extended at one end by a second arc of circle centered on the straight line joining both ends of said first semi-circular arc, said second arc being extended by a straight portion parallel to the other symmetry plane and spaced from the latter by $e$, and the first arc is extended at the other end by a third arc of a circle which is concentrical with said second arc.

11. The propellant element according to claim 10, wherein $0.2 R < e < 0.315 R$

12. A propellant element as claimed in claim 10, wherein said straight portion passes through the center of said second arc.

13. A propellant element as claimed in claim 10, wherein said straight portion is tangential to said second arc.

14. A propellant element according to claim 8 wherein the straight line tangential to said arc CF is parallel to said symmetry plane and the distance $d$ between said symmetry plane and said straight line is
$0.03R \quad d < 0.06 R$ 15. A propellant element according to claim 1 wherein $e/R$ is less than 0.5.

16. A propellant element according to claim 1, wherein the ratio $So/S_f$, in which $So$ is the initial combustion surface and $S_f$ is the final combustion surface, does not exceed a value of about 3.5.

* * * * *